(12) United States Patent
Farhadiroushan et al.

(10) Patent No.: US 9,823,114 B2
(45) Date of Patent: Nov. 21, 2017

(54) NON-ISOTROPIC ACOUSTIC CABLE

(71) Applicant: Silixa Ltd., Elstree Hertfordshire (GB)

(72) Inventors: Mahmoud Farhadiroushan, Elstree (GB); Daniel Finfer, Elstree (GB); Dmitry Strusevich, Elstree (GB); Sergey Shatalin, Elstree (GB); Tom Parker, Elstree (GB)

(73) Assignee: Silixa Ltd., Elstree Hertfordshire (GB)

( * ) Notice: Subject to any disclaimer, the term of this patent is extended or adjusted under 35 U.S.C. 154(b) by 0 days.

(21) Appl. No.: 15/021,319

(22) PCT Filed: Sep. 4, 2014

(86) PCT No.: PCT/GB2014/052679
§ 371 (c)(1),
(2) Date: Mar. 11, 2016

(87) PCT Pub. No.: WO2015/036735
PCT Pub. Date: Mar. 19, 2015

(65) Prior Publication Data
US 2016/0223389 A1  Aug. 4, 2016

(30) Foreign Application Priority Data

Sep. 13, 2013 (GB) .................... 1316362.1
Sep. 13, 2013 (GB) .................... 1316364.7

(51) Int. Cl.
*G02B 6/00* (2006.01)
*G01H 9/00* (2006.01)
(Continued)

(52) U.S. Cl.
CPC ............. *G01H 9/004* (2013.01); *G01L 1/242* (2013.01); *G01M 7/00* (2013.01); *G02B 6/4405* (2013.01); *G02B 6/4415* (2013.01)

(58) Field of Classification Search
CPC .... G02B 6/4405; G02B 6/4415; G01H 9/004; G01L 1/242; G01M 7/00
(Continued)

(56) References Cited

U.S. PATENT DOCUMENTS 4,294,513 A * 10/1981 Nelson ..................... G01H 9/00
                                              177/210 R
4,375,680 A *  3/1983 Cahill ..................... G01H 9/004
                                              356/483

(Continued)

FOREIGN PATENT DOCUMENTS

EP  0027540 A2  4/1981
EP  2418466 A2  2/2012
(Continued)

OTHER PUBLICATIONS

Intellectual Property Office, Search Report under Section 17 for GB Application No. 1316362.1, Date of Search: Apr. 16, 2014.
(Continued)

*Primary Examiner* — Thomas A Hollweg
*Assistant Examiner* — Guy Anderson
(74) *Attorney, Agent, or Firm* — Honigman Miller Schwartz and Cohn LLP

(57) ABSTRACT

Embodiments of the present invention address aliasing problems by providing a plurality of discrete acoustic sensors along a cable whereby acoustic signals may be measured in situations where the fiber optic cable has not been secured to a structure or area by a series of clamps, as described in the prior art. Acoustic sampling points are achieved by selectively enhancing the acoustic coupling between the outer layer and the at least one optical fiber arrangement, such that acoustic energy may be transmitted selectively from the outer layer to the at least one optical fiber arrangement. The resulting regions of acoustic coupling along the cable allow
(Continued)

the optical fiber to detect acoustic signals. Regions between the outer layer and the at least one optical fiber arrangement that contain material which is acoustically insulating further this enhancement since acoustic waves are unable to travel through such mediums, or at least travel through such mediums at a reduced rate.

7 Claims, 15 Drawing Sheets

(51) Int. Cl.
    *G01L 1/24*     (2006.01)
    *G01M 7/00*     (2006.01)
    *G02B 6/44*     (2006.01)

(58) Field of Classification Search
    USPC .................................................... 385/12–13
    See application file for complete search history.

(56) References Cited

U.S. PATENT DOCUMENTS

| | | | | |
|---|---|---|---|---|
| 4,449,210 A * | 5/1984 | Myer | ...................... | G02B 6/14 177/210 R |
| 4,524,436 A * | 6/1985 | Hall | ...................... | G01H 9/004 367/154 |
| 5,268,911 A * | 12/1993 | Young | ...................... | G02F 1/11 372/13 |
| 5,892,860 A * | 4/1999 | Maron | ............... | G01D 5/35383 374/E5.034 |
| 6,002,646 A * | 12/1999 | Reid | .................... | H04R 23/008 367/149 |
| 6,160,762 A | 12/2000 | Luscombe et al. | | |
| 6,522,797 B1 * | 2/2003 | Siems | .................... | G01H 3/005 250/227.14 |
| 7,024,081 B2 * | 4/2006 | Dowd | ................. | G02B 6/4492 166/351 |
| 7,412,118 B1 * | 8/2008 | Shaibani | ................ | G01H 9/004 385/12 |
| 7,630,066 B2 * | 12/2009 | Kachmar | ............... | G01M 11/30 356/440 |
| 7,720,323 B2 * | 5/2010 | Yamate | ................. | E21B 47/123 166/244.1 |
| 7,946,350 B2 * | 5/2011 | Greenaway | ............. | E21B 17/18 166/241.1 |
| 8,315,486 B2 * | 11/2012 | Pearce | .................... | G01V 8/16 250/268 |
| 9,250,120 B2 * | 2/2016 | Smith | ................ | G01K 11/3206 |
| 9,255,836 B2 * | 2/2016 | Taverner | ................ | G01H 9/004 |
| 9,459,329 B2 * | 10/2016 | McEwen-King | .. | G01R 33/0327 |
| 2007/0116403 A1 * | 5/2007 | Blemel | ............... | G01M 5/0091 385/12 |
| 2009/0067776 A1 * | 3/2009 | Ramos | ................. | G02B 6/4436 385/12 |
| 2012/0092960 A1 | 4/2012 | Gaston et al. | | |
| 2012/0111104 A1 * | 5/2012 | Taverner | ................ | G01H 9/004 73/152.16 |
| 2012/0111560 A1 | 5/2012 | Hill et al. | | |
| 2013/0291642 A1 * | 11/2013 | Crickmore | ............. | G01H 9/004 73/655 |
| 2014/0022530 A1 * | 1/2014 | Farhadiroushan | ...... | G01S 5/186 356/35.5 |
| 2014/0025319 A1 * | 1/2014 | Farhadiroushan | ...... | G01S 5/186 702/56 |
| 2014/0036957 A1 * | 2/2014 | Farhadiroushan | ........ | G01K 1/14 374/161 |
| 2014/0312215 A1 * | 10/2014 | Smith | ................ | G01K 11/3206 250/253 |

FOREIGN PATENT DOCUMENTS

| | | | |
|---|---|---|---|
| EP | 2912418 | A2 | 9/2015 |
| GB | 2310280 | A | 8/1997 |
| WO | WO-2010136809 | A2 | 12/2010 |
| WO | WO-2011058314 | A1 | 5/2011 |
| WO | WO-2011079098 | A2 | 6/2011 |
| WO | WO-2012095640 | A2 | 7/2012 |
| WO | WO-2012114077 | A2 | 8/2012 |
| WO | WO-2012177547 | A1 | 12/2012 |
| WO | WO-2013098321 | A2 | 7/2013 |
| WO | WO 2013171460 | * | 11/2013 ............. G01H 9/004 |

OTHER PUBLICATIONS

Intellectual Property Office, Search Report under Section 17 for GB Application No. 1316364.7 Date of Search: Apr. 17, 2014.

International Searching Authority, International Search Report and Written Opinion for PCT Application No. PCT/GB2014/052679, mailed Feb. 20, 2015.

Intellectual Property Office, Patents Act 1977: Examination Report under Section 18(3) for GB Application No. 1316362.1, dated Apr. 28, 2017.

Intellectual Property Office, Patents Act 1977: Examination Report under Section 18(3) for GB Application No. 1316364.7, dated May 12, 2017.

* cited by examiner

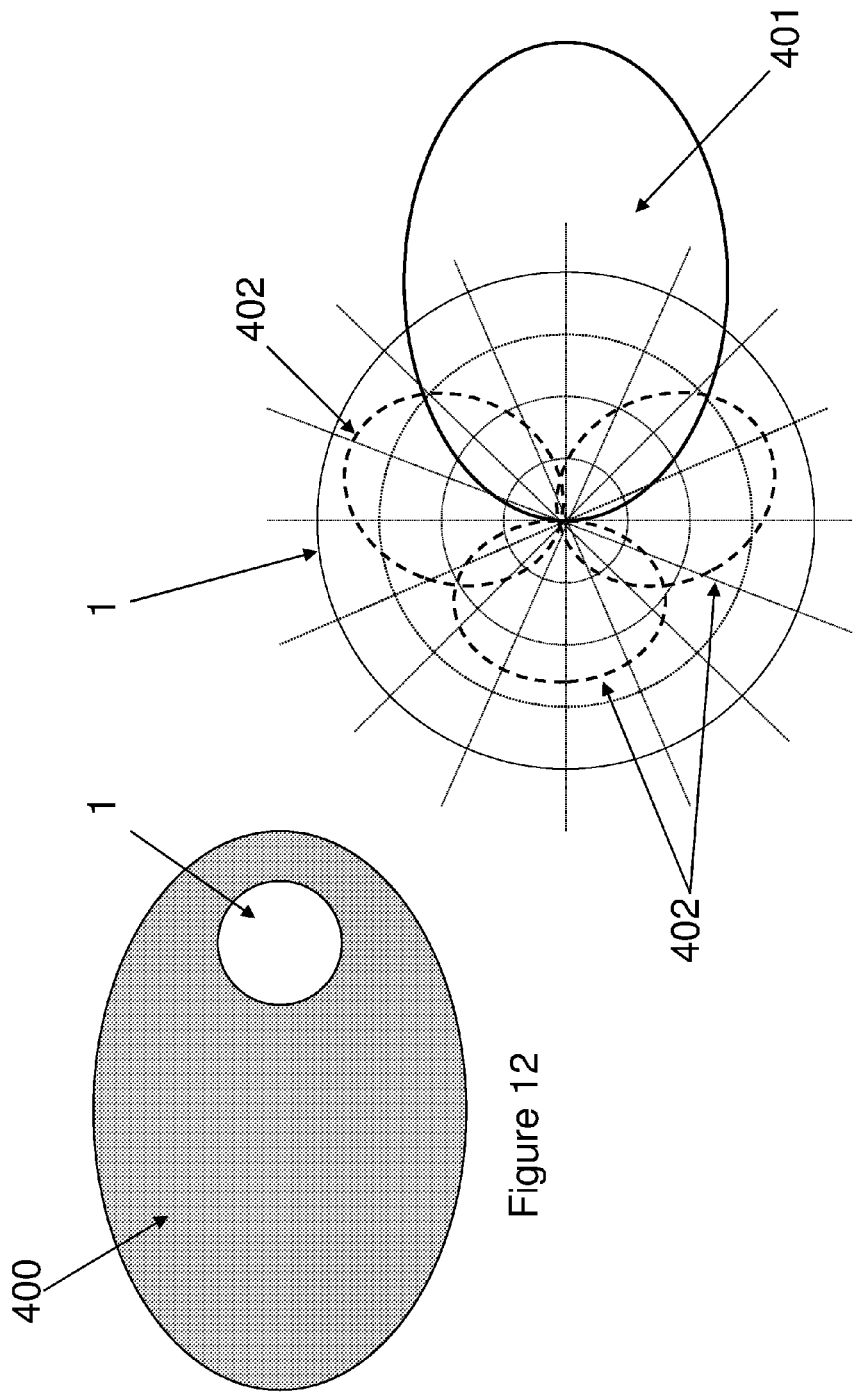

NON-ISOTROPIC ACOUSTIC CABLE

CROSS-REFERENCE TO RELATED APPLICATIONS

This application claims priority under 35. U.S.C. §371 to Patent Cooperation Treaty Application No. PCT/GB2014/052679, filed Sep. 4, 2014, which claims priority to GB Application No. 1316364.7, filed Sep. 13, 2013, and to GB Application No. 1316362.1, filed Sep. 13, 2013, the entire contents of which are incorporated herein by reference.

TECHNICAL FIELD

The present invention relates to a fibre optic cable, and in some embodiments provides a fibre optic cable which has an acoustic sensitivity that is non-isotropic. In other embodiments there is provided a fibre optic cable which comprises an array of discrete acoustic coupling regions.

BACKGROUND TO THE INVENTION AND PRIOR ART

To detect an acoustic signal, distributed acoustic sensing is commonly and effectively used. This method employs fibre optic cables to provide distributed acoustic sensing whereby the fibre optic cable acts as a string of discrete acoustic sensors, and an optoelectronic device measures and processes the returning signal. The operations of such a device is described next.

A pulse of light is sent into the optical fibre, and a small amount of light is naturally back scattered, along the length of the fibre by Rayleigh, Brillouin and Raman scattering mechanisms. The scattered light is captured by the fibre and carried back towards the source where the returning signal is measured against time, allowing measurements in the amplitude, frequency and phase of the scattered light to be determined. If an acoustic wave is incident upon the cable, the glass structure of the optical fibre is caused to contract and expand within the vibro-acoustic field, consequently varying the optical path lengths between the back scattered light scattered from different locations along the fibre. This variation in path length is measured as a relative phase change, allowing the optical phase angle data to be used to measure the position of the acoustic signal at the point at which light is reflected. The returning signal can also be processed in order to determine the frequency of oscillation of vibration in the structure.

In known distributed acoustic sensing systems (DAS), standard fibre optic cables are utilised to obtain a measurement profile from along the entire length of the fibre at intervals ranging from 1-10 meters. Further details regarding the operation of a suitable DAS system, such as the iDAS™, available from Silixa Limited, of Elstree, UK are given in WO2010/0136809. Systems such as these are able to digitally record acoustic fields at every interval location along an optical fibre at frequencies up to 100 kHz. Since the position of the acoustic sensors is known (the fibre deployment being known), the source of any acoustic signal can be thus identified by means of time-of-arrival calculations. In a typical deployment, the sensing points are usually created by clamps which are used to secure the fibre optic cable to the structure or area it is monitoring.

By way of example, FIG. 1 shows a common arrangement of a known fibre optic cable 1, comprising at least one optical fibre, contained in a series of concentric tubular structures. The cable generally comprises firstly an inner tubular structure, typically called a fibre-in-metal-tube (FIMT) 2, which provides a way of encapsulating very long lengths of optical fibres 5 within a hermetically sealed tube 4. A general construction of a FIMT 2 includes at least one optical fibre 5 encapsulated in a metal tube 4. Additionally, it is common to fill this metal tube 4 with a thixotropic gel 6 in order to protect the optical fibres 5 from environmental disturbances, prevent damage from micro-bending conditions and to help minimise the forces applied during spooling and deployment of the cable. Most importantly for distributed acoustic sensing, the thixotropic gel 6 supports the optical fibre 5, preventing excessive movement within the metal tube 4 which reduces the amount of resonant frequencies. The FIMT 2 is typically then encapsulated by a further outer tube 3, usually containing a filler material.

The optical fibres 5 are typically made of flexible, transparent fibres of glass. The filler material 3 surrounding the FIMT 2 has a lower refractive index than the optical fibres 5 such that light which has been focused into the optical fibres 5 is confined due to total internal reflection, hence enabling the light to propagate down the length of the optical fibres 5 without any light being lost.

There are many applications for which distributed acoustic sensing may be used, for example, monitoring hydraulic fracturing of oil or gas structures and surveillance methods of assets such as oil or gas pipelines and airport runways. In order to monitor such assets, the fibre optic cables are usually secured to the structure or area by clamps distributed along the length of the fibre optic cable.

By way of example, FIG. 2 illustrates how fibre optic cables 1 may be used to monitor structures or areas using distributed acoustic sensing.

FIG. 2 shows a fibre optic cable 1 being used to monitor a pipeline 7 that has been deployed underground 9. The fibre optic cable 1 is positioned to run parallel alongside the pipeline 7 and is secured by a series of clamps 8, which are distributed along the length of the pipeline 7. These clamps 8 allow the fibre optic cable 1 to monitor the pipeline 7 through distributed acoustic sensing since the clamps 8 themselves act as an array of acoustic coupling regions. The clamps 8 transmit any vibrations in the pipeline 7, such that the acoustic energy is transmitted to the optical fibres 5.

The clamps are spaced along the fibre at a distance at least equal to or greater than the sensing resolution of the distributed acoustic sensing, typically 1-5 meters. This provides discrete sensing points along the fibre matched to the sensing resolution and prevents any anti-aliasing effects in the detected acoustic signal.

In some deployments, however, it is not possible to secure the cable with clamps, and instead the cable may be inserted in a concrete trench or the like running parallel to a pipe, well, or any other structure being monitored. In this case there are no discrete sensing points as is provided by the clamps, and hence the fibre can sense at all points along its length.

As a consequence, due to the sensing resolution of the fibre being less than the actual resolution of the points at which acoustic energy is being sensed, aliasing effects can occur in the signal, due to undersampling.

Another problem faced when using fibre optic cables in distributed acoustic sensing is that acoustic signals incoming from one direction may overcome acoustic signals incoming from another direction, making it difficult for the fibre optic cable to detect the latter. This may prove problematic for certain applications of distributed acoustic sensing. Consider, by way of example, fibre optic cables used for surveillance of an asset. Acoustic signals emitted by the asset itself may obscure any acoustic signals incoming from the surroundings towards the asset. However, in security surveillance, it is the incoming acoustic signals caused by disturbances in regions surrounding the asset that are of interest. Therefore, it would be advantageous if the fibre optic cable was more acoustically sensitive in the directions corresponding to the surrounding area such that the ability to detect acoustic signals in these direction is greater.

SUMMARY OF THE INVENTION

Embodiments of the present invention address the above noted aliasing problem by providing a plurality of discrete acoustic sampling points along a fibre optic cable whereby acoustic signals may be measured in situations where the fibre optic cable has not been secured to a structure or area by a series of clamps, as described in the prior art. Acoustic sampling points are achieved by selectively enhancing the acoustic coupling between an outer layer and at least one optical fibre arrangement, such that acoustic energy may be transmitted selectively from the outer layer to the optical fibres. The resulting regions of acoustic coupling along the fibre optic cable allow the optical fibre to detect acoustic signals.

Further embodiments of this invention address the above noted problems associated with interfering acoustic signals by providing directional acoustic sensing. This is achieved by adapting the acoustic response of a fibre optic cable so as focus the acoustic sensitivity of the fibre optic cable directionally along the entire length of the fibre optic cable, such that the acoustic sensitivity is non isotropic in the plane normal to the length of the cable. In some embodiments, the adapting of the acoustic response is performed by the provision of an acoustically reactive mass, such as a sleeve or coating, being placed around the fibre optic cable, the mass having spatial acoustic properties required to give the directional acoustic response required.

According to one aspect of the present invention, there is provided a fibre optic cable, comprising at least one optical fibre arrangement, and at least one outer layer encapsulating the at least one optical fibre arrangement. The fibre optic cable further comprises an acoustic insulating layer between the at least one optical fibre arrangement and the outer layer, the insulating layer being interspersed along the length of the fibre with discrete acoustic coupling regions for transmitting acoustic energy from the outer layer to the at least one optical fibre arrangement.

Preferably, the at least one optical fibre arrangement comprises a fibre-in-metal-tube (FIMT), as described in the above prior art. This is a standard and widely used arrangement for the cores of fibre optic cables, therefore existing cables which have already been deployed may be conveniently adapted to incorporate the features of the present invention.

In some embodiments, the acoustic insulating layer includes a layer of air. Air is a material with low acoustic coupling such that it effectively absorbs acoustic energy and reduces its transmission. Acoustic coupling relates to the resistance of the material's particles to the mechanical vibrations of an acoustic signal. That is to say, materials that do not resist the mechanical vibrations easily couple with the mechanical vibrations and have high acoustic coupling properties. Since air particles provide a large amount of resistance to the vibrations, air exhibits low acoustic coupling and is considered to be a good acoustic insulating material, which is also convenient and cost-effective to use.

In a preferred embodiment of the invention, a filler is inserted between the at least one optical fibre arrangement and the outer layer. The filler comprises of built up regions interspersed along the length of the fibre optic cable, wherein the built up regions of filler provide the discrete acoustic coupling regions.

The built up regions of filler connect the at least one optical fibre arrangement and the outer layer such that acoustic energy can be transmitted between them, therefore enhancing the acoustic coupling between the at least one optical fibre arrangement and the outer layer. Therefore, fibre optic cables with built in discrete acoustic coupling regions may be deployed and used to detect acoustic signals without the use of clamps securing them to the monitored structure or area.

In another preferred embodiment of the invention, at least one layer concentrically outside the acoustic insulating layer is narrowed at points interspersed along the length of the fibre optic cable so as to divide the acoustic insulating layer and provide discrete acoustic coupling regions.

The narrowed points bridge the gap between the at least one optical fibre arrangement and the outer layer such that acoustic energy can be transmitted between them, therefore enhancing the acoustic coupling between the at least one optical fibre arrangement and the outer layer. Therefore, fibre optic cables with built in discrete acoustic coupling regions may be deployed and used to detect acoustic signals without the use of clamps securing them to the monitored structure or area.

Preferably, the narrowed points are achieved by crimping the fibre optic cable at points interspersed along its length such that the inner face of the outer layer immediately next to the insulating layer comes into contact with the layer inwards of the insulating layer towards the at least one optical fibre arrangement. In doing this, the crimped portions effectively short-circuit the insulating layer to provide the discrete acoustic coupling regions.

Preferably, the distance between acoustic coupling regions is at least 1 meter. This ensures that the sensing resolution of the fibre matches the actual resolution of the points at which acoustic energy is being sensed so as to avoid aliasing effects as a result of undersampling.

In a further embodiment, the size of the discrete acoustic coupling regions along the length of the fibre optic cable is at most 50 cm. This is a suitable size value that ensures that the acoustic coupling regions are sufficiently small that they provide discrete points to detect acoustic signal, but large enough that they are able to couple with acoustic vibrations.

In another preferred embodiment, the size of the discrete acoustic coupling regions along the length of the fibre optic cable is at least 10 cm. This is a preferred size value that ensures that the acoustic coupling regions are sufficiently small that they provide discrete points to detect acoustic signal, but large enough that they are able to couple with acoustic vibrations.

According to a further embodiment of the present invention, wherein the discrete acoustic coupling regions comprise a periodic structure. Preferably, the periodic structure is achieved by dividing the discrete acoustic coupling regions into equal portions. This periodic structure provides discrete acoustic coupling points within the discrete coupling region.

Preferably, the size of the equal portions along the length of the fibre optic cable is at most 5 cm, and the size of the equal portions along the length of the fibre optic cable is at least 1 cm.

In view of the above, from another aspect, the present invention provides a distributed acoustic sensing system comprising a fibre optic cable wherein discrete acoustic coupling regions are interspersed along the length of the fibre optic cable.

As shown in the prior art, known distributed acoustic sensing systems utilise clamps, which secure the cable to the structure or area that is being monitored. The clamps act as acoustic coupling points such that they detect acoustic signals by transmitting the acoustic energy of the signals to the at least one optical fibre arrangement. In some situations, the use of clamps is not possible and the fibre no longer consists of an array of acoustic sensing points, resulting in aliasing effects. To resolve this deficiency, the present invention provides a fibre optic cable that includes the feature of discrete acoustic coupling points, wherein the acoustic coupling between the at least one optical fibre arrangement and the outer layer has been enhanced. Consequently, the cable may be deployed alongside a structure or area, without the use of clamps, and be used to detect acoustic signals.

Preferably, the locations of the discrete acoustic coupling regions are known and match the resolution of a distributed acoustic sensor system.

Distributed acoustic sensor systems are able to resolve acoustic signals with a spatial resolution of up to 1 m, thus it is preferable that the plurality of discrete acoustic sensors match this resolution. In doing this, the sensing points will be phase matched, thus enhancing the detection sensitivity.

A further aspect of the present invention provides a fibre optic cable which has an acoustic sensitivity that is non isotropic. This enables incoming acoustic signals to be preferentially detected from particular directions. Preferably, the acoustic sensitivity is adapted in at least one or more directions extending in the plane normal to the length of the fibre optic cable.

In one embodiment of this aspect of the invention, a fibre optic cable is provided wherein a filler is inserted in a gap between at least one optical fibre arrangement and an outer layer, wherein the filler comprises built up regions that bridge the gap between the at least one optical fibre arrangement and the outer layer so as to enable acoustic energy to be transmitted from the outer layer to the at least one optical fibre arrangement. Furthermore, the built up regions of filler extend in at least one direction in the plane normal to the length of the fibre optic cable so as to directionally adapt the regions of acoustic coupling.

A preferred embodiment of this aspect of the invention provides a fibre optic cable wherein an acoustically reactive mass surrounds the fibre optic cable. The acoustically reactive mass is preferably a material with high acoustic coupling such that it effectively transmits acoustic energy. This allows the acoustic sensitivity to be directionally adapted in the plane normal to the length of the fibre optic cable, whereby the direction of detection of incoming acoustic signals in this plane may be chosen.

Preferably, at least one segment of acoustic insulation is placed in the acoustically reactive mass so as to reduce the acoustic coupling of the fibre optic cable in at least one direction in the plane normal to the length of the fibre optic cable. In doing this, acoustic signals will be detected with greater sensitivity in the directions corresponding to regions of the mass where acoustic insulation has not been incorporated, thus adapting the acoustic sensitivity in these regions. For example, the acoustic insulation attenuates incoming acoustic waves from directions which are incident on the insulation, thus preventing or reducing the detection.

In another embodiment, at least one segment of acoustically reactive material is placed in the acoustically reactive mass surrounding the fibre optic cable so as to further adapt the acoustic sensitivity in at least one direction in the plane normal to the fibre optic cable. This will result in greater acoustic sensitivity in directions corresponding to regions where the segments of acoustically reactive material have been places such that incoming acoustic signals will be easily detected.

In one embodiment, the at least one segment of acoustically reactive material is arranged to be interspersed at intervals along the length of the fibre optic cable to produce a plurality of discrete acoustic coupling regions, which also have directional acoustic sensitivity. Alternatively, the at least one segment of acoustically reactive mass may extend substantially continuously along the length of the fibre optic cable.

Another embodiment of this aspect of the invention provides a fibre optic cable wherein an acoustically insulating mass surrounds the fibre optic cable, whereby the acoustic sensitivity is directionally adapted in the plane normal to the length of the fibre optic cable by the acoustically insulating mass. In doing this, acoustic signals will be detected with lower sensitivity in directions corresponding to regions of greater acoustic insulation.

Preferably, the fibre optic cable is placed in the acoustically insulting mass in a non-isotropic configuration so as to vary the acoustic coupling in the plane normal to the length of the fibre optic cable. That is to say, acoustic signals will be detected with greater sensitivity in regions corresponding to a higher acoustic coupling.

In another preferred embodiment of this aspect of the invention, the acoustically insulating mass has a non-isotropic configuration so as to vary the acoustic coupling in the plane normal to length of the fibre optic cable. In doing this, the acoustic sensitivity is greater in regions wherein incoming acoustic waves are attenuated to a lesser degree.

In one embodiment, at least one segment of acoustic insulation is placed in the acoustically insulating mass so as to further adapt the acoustic sensitivity of the fibre optic cable in at least one direction in the plane normal to the length of the fibre optic cable. By doing this, acoustic signals will be detected with less sensitivity in the directions corresponding to regions of the mass where acoustic insulation has been incorporated, thus adapting the acoustic sensitivity in these regions In another embodiment, at least one segment of acoustically reactive material is placed in the acoustically insulating mass so as to further adapt the acoustic sensitivity in at least one direction in the plane normal to the fibre optic cable. This will result in greater acoustic sensitivity in directions corresponding to regions where the segments of acoustically reactive material have been places such that incoming acoustic signals will be easily detected.

In a further embodiment of the present invention, the at least one segment of acoustically reactive material is arranged to be interspersed at intervals along the length of the fibre optic cable to produce a plurality of discrete acoustic coupling regions, which also have directional acoustic sensitivity. Alternatively, the at least one segment of acoustically reactive material may extend substantially continuously along the length of the fibre optic cable.

BRIEF DESCRIPTION OF DRAWINGS

The present invention will now be described by way of example only, and with reference to the accompanying drawings in which:

FIG. 12 shows in schematic form another embodiment of the present invention, wherein a fibre optic cable is surrounded by a layer of acoustic insulation material so as to provide non isotropic acoustic sensitivity;

FIG. 13 shows a graphical representation of the non isotropic acoustic sensitivity in relation to the embodiment shown in FIG. 12;

DETAILED DESCRIPTION OF PREFERRED EMBODIMENTS

In a particular embodiment of the invention, described here in order to provide an example of a preferred implementation of the present invention, a distributed acoustic sensor is provided along a fibre optic cable, which emulates having a plurality of discrete sensing points. In order to emulate the discrete points of acoustic coupling, the acoustic coupling between the outer layer and the at least one optical fibre arrangement is adapted as will be described.

Figure 3:
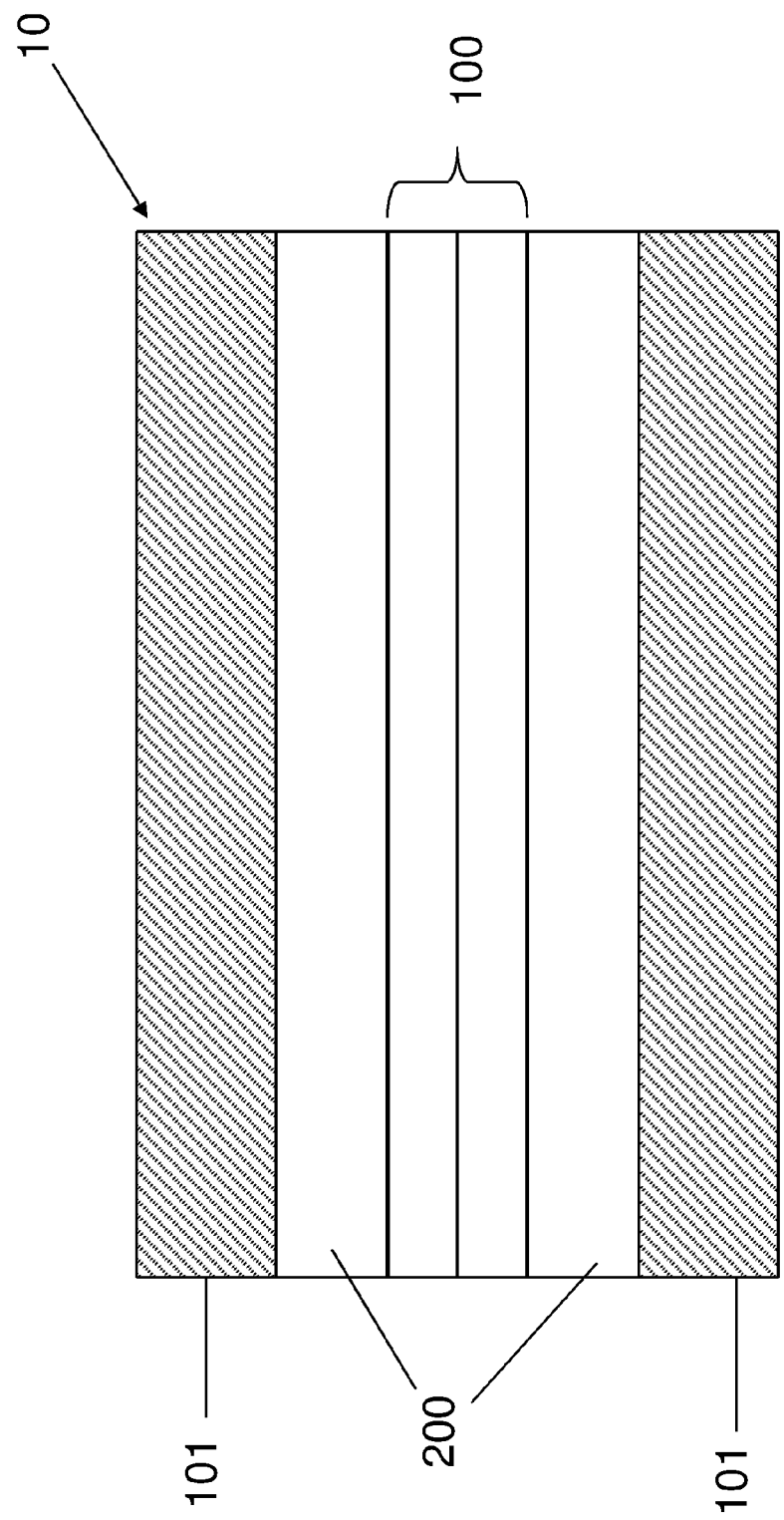
FIG. 3 shows in schematic form a preliminary step in an embodiment of the present invention, whereby a layer of acoustic insulating material is placed between the outer layer and the at least one optical fibre.

With reference to FIG. 3, there is provided a length of fibre optic cable 10 comprising at least one optical fibre arrangement 100 surrounded concentrically by an outer layer 101, wherein a gap 200 is provided between the at least one optical fibre arrangement 100 and the outer layer 101. The gap 200 comprises at least one acoustic insulating material, typically air, which exhibits low acoustic coupling. The air layer 200 acts as a sound insulating layer between the outer layer 101 and the at least one optical fibre arrangement 100 at least one optical fibre arrangement 100.

Figure 4:
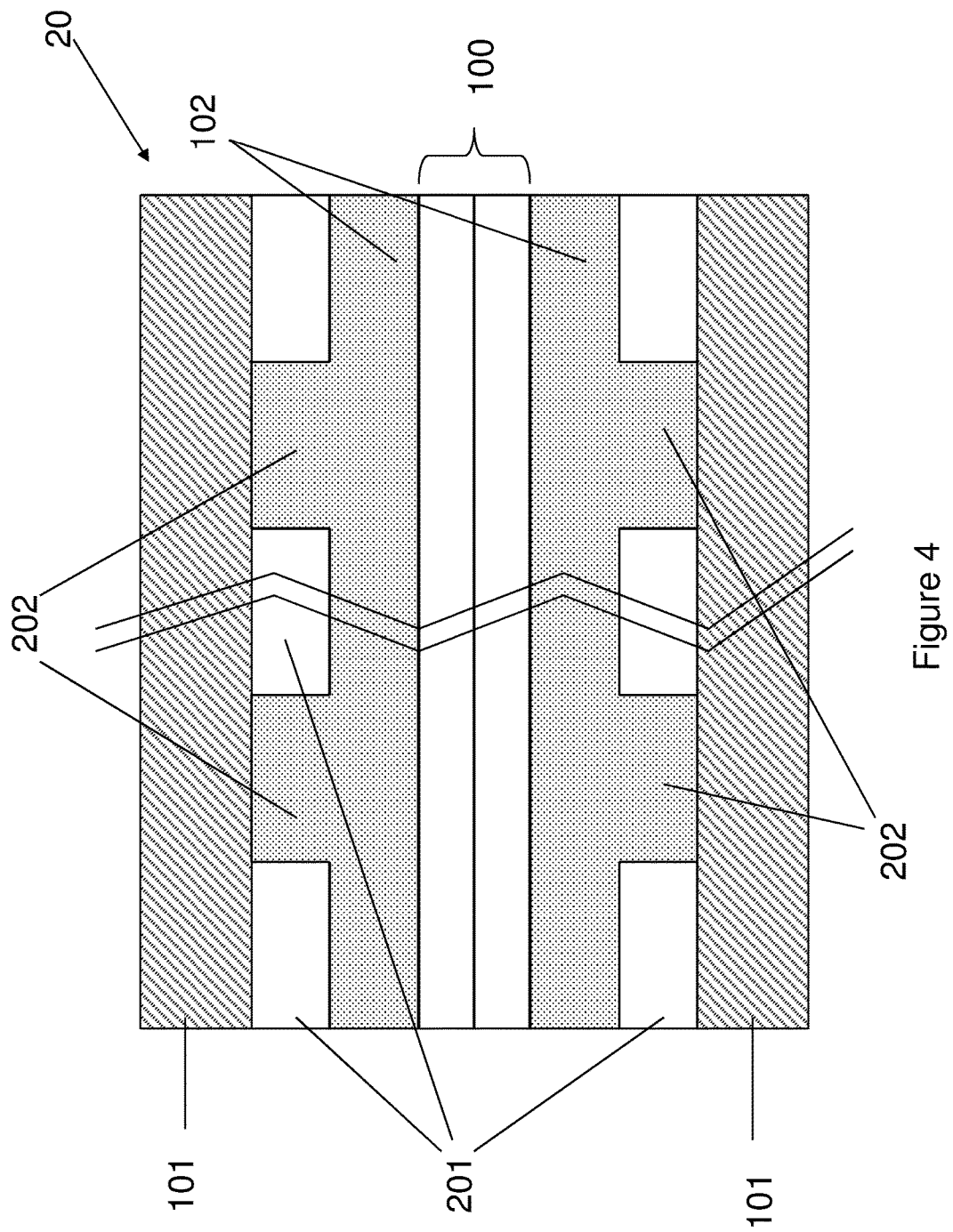
FIG. 4 shows in schematic form a first embodiment of the present invention, wherein acoustic sensing points are achieved by the insertion of a filler so as to produce regions of acoustic coupling.

A preferred embodiment of the present invention is illustrated by FIG. 4, wherein a filler 102 is inserted into the gap 200 between the at least one optical fibre arrangement 100 and the outer layer 101. The filler 102 is configured so as to provide built up regions at points interspersed along the length of the fibre optic cable 20, thus creating regions of acoustic insulation 201 between the built up regions of filler 102. The built up regions of filler 102 bridge the gap between the outer layer 101 and the at least one optical fibre arrangement 100 so as to produce regions of relative acoustic coupling 202. This couples the outer layer 101 and the at least one optical fibre arrangement 100 such that the acoustic energy, as a result of acoustic signals incident on the fibre optic cable 20, may be transmitted to the at least one optical fibre arrangement 100 at the acoustically coupling regions 202, hence enabling incident acoustic signals to be detected by the fibre optic cable 20 at these points along its length. The regions of acoustic insulation 201 adapt the acoustic coupling between the at least one optical fibre arrangement 100 and the outer layer 101 such that these points along the fibre optic cable 20 have lower acoustic coupling and the transmission of acoustic energy is impeded, hence enhancing the effect of the regions of acoustic coupling 202.

Preferably, the acoustic insulating regions 201 are typically 1-5 meters in length, so that the sensing resolution of the fibre optic cable 20 matches the actual resolution of the points at which acoustic energy is being sensed. The built up regions of filler 102, that is to say the coupling regions, are sufficiently small that they provide discrete points at which the acoustic signal may be detected. For example, the acoustic coupling regions may be approximately 10 to 50 cm in length. The built up regions of filler 102 should not, however, be so small, for example, smaller than 1 cm, that they do not provide a region large enough to transmit the acoustic energy.

Figure 5:
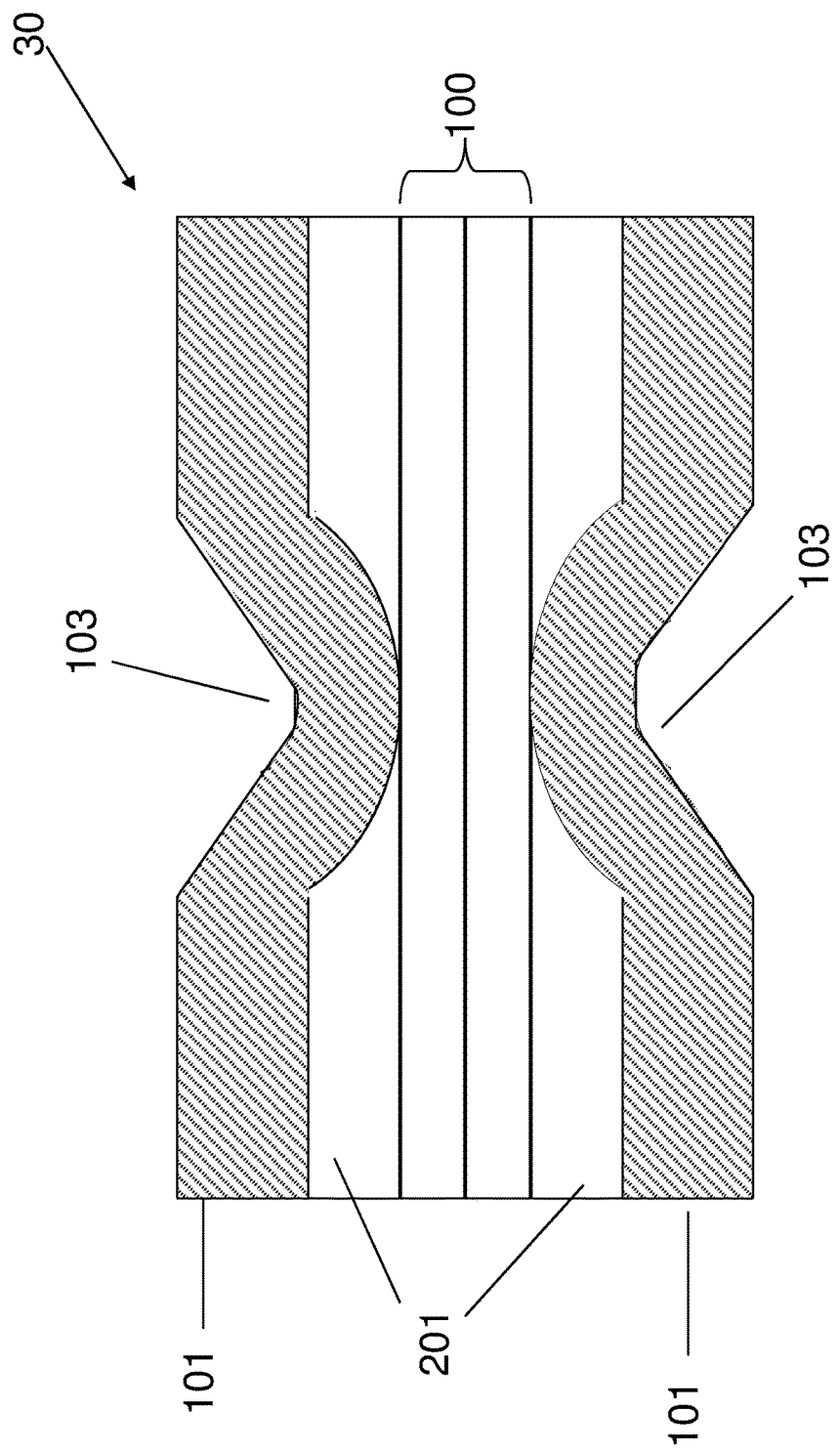
FIG. 5 shows in schematic form a second embodiment of the present invention, whereby acoustic sensing points are achieved by crimping the fibre optic cable, thereby creating regions of acoustic coupling.

An alternative embodiment of the present invention is illustrated by FIG. 5, wherein a fibre optic cable 10 described by FIG. 3 is crimped, for example by a manual means, at intervals along its length to produce fibre optic cable 30. The crimped portions 103 of the fibre optic cable 30 are such that the inner face of the outer layer 101 comes into contact with the at least one optical fibre arrangement 100, therefore bridging the insulating gap 200 between the outer layer 101 and the at least one optical fibre arrangement 100 at that point. The fibre optic cable 30 is not crimped insofar that it squashes the at least one optical fibre arrangement 100 in any way. The crimped portions 103 thus provide regions of acoustic coupling such that the outer layer 101 is able to transmit acoustic energy to the at least one optical fibre arrangement 100 at discrete points corresponding to the crimped portions. This results in regions of acoustic insulation 201 along the length of the fibre optic cable 30 between each point of acoustic coupling 103.

The crimped portions 103 couple the outer layer 101 and the at least one optical fibre arrangement 100 such that the acoustic energy, as a result of acoustic signals incident on the fibre optic cable 30, may be transmitted to the at least one optical fibre arrangement 100, hence enabling acoustic signals to be detected by the fibre optic cable 30 at these points along its length. The regions of acoustic insulation 201 help to adapt the acoustic coupling between the at least one optical fibre arrangement 100 and the outer layer 101 such that these points along the fibre optic cable 30 have lower acoustic coupling and the transmission of acoustic energy is impeded, hence enhancing the effect of the regions of acoustic coupling.

Figure 2:
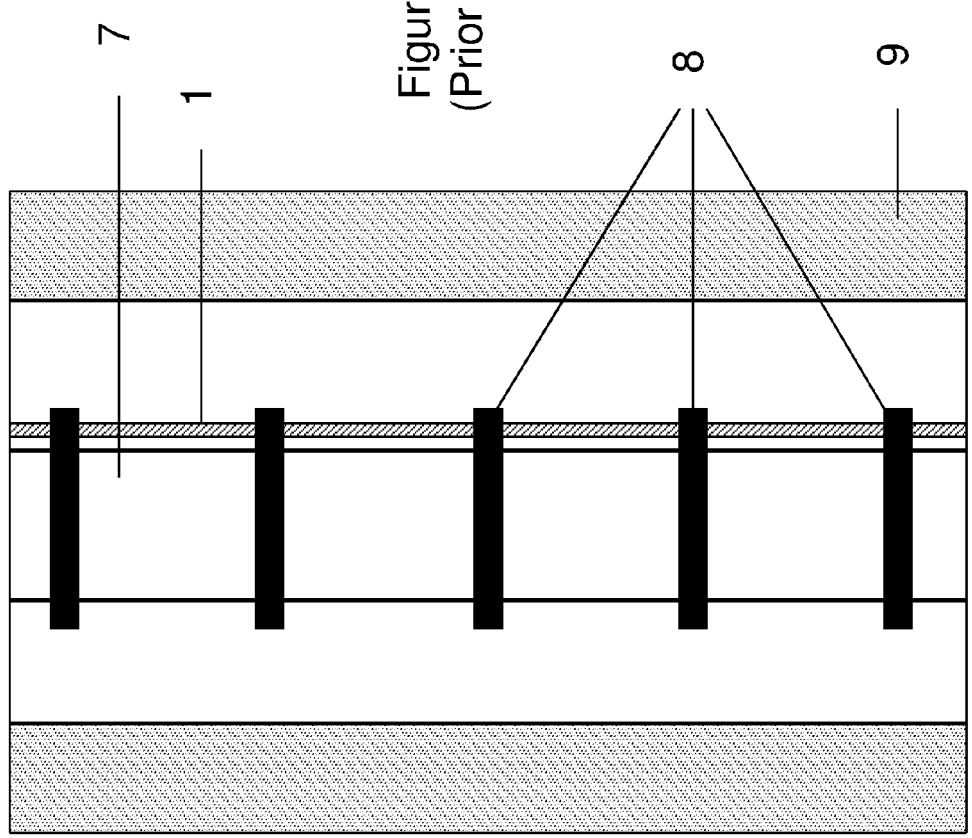
FIG. 2 illustrates a typical fibre optic cable deployment for distributed acoustic sensing of the prior art.

Preferably, the acoustic insulation regions 201 are typically 1-5 meters in length, so that the sensing resolution of the fibre optic cable 30 matches the actual resolution of the points at which acoustic energy is being sensed, when, for example, the fibre optic cable 1 is held by clamps such as shown in FIG. 2. The crimped portions 103, that is to say the coupling regions, are sufficiently small that they provide discrete points at which the acoustic signal may be detected. Preferably, the acoustic coupling regions are 10 to 50 cm in length. The crimped portions 103 should not, however, be so small, for example, smaller than 1 cm, that they do not provide a region large enough to transmit the acoustic energy.

Figure 6:
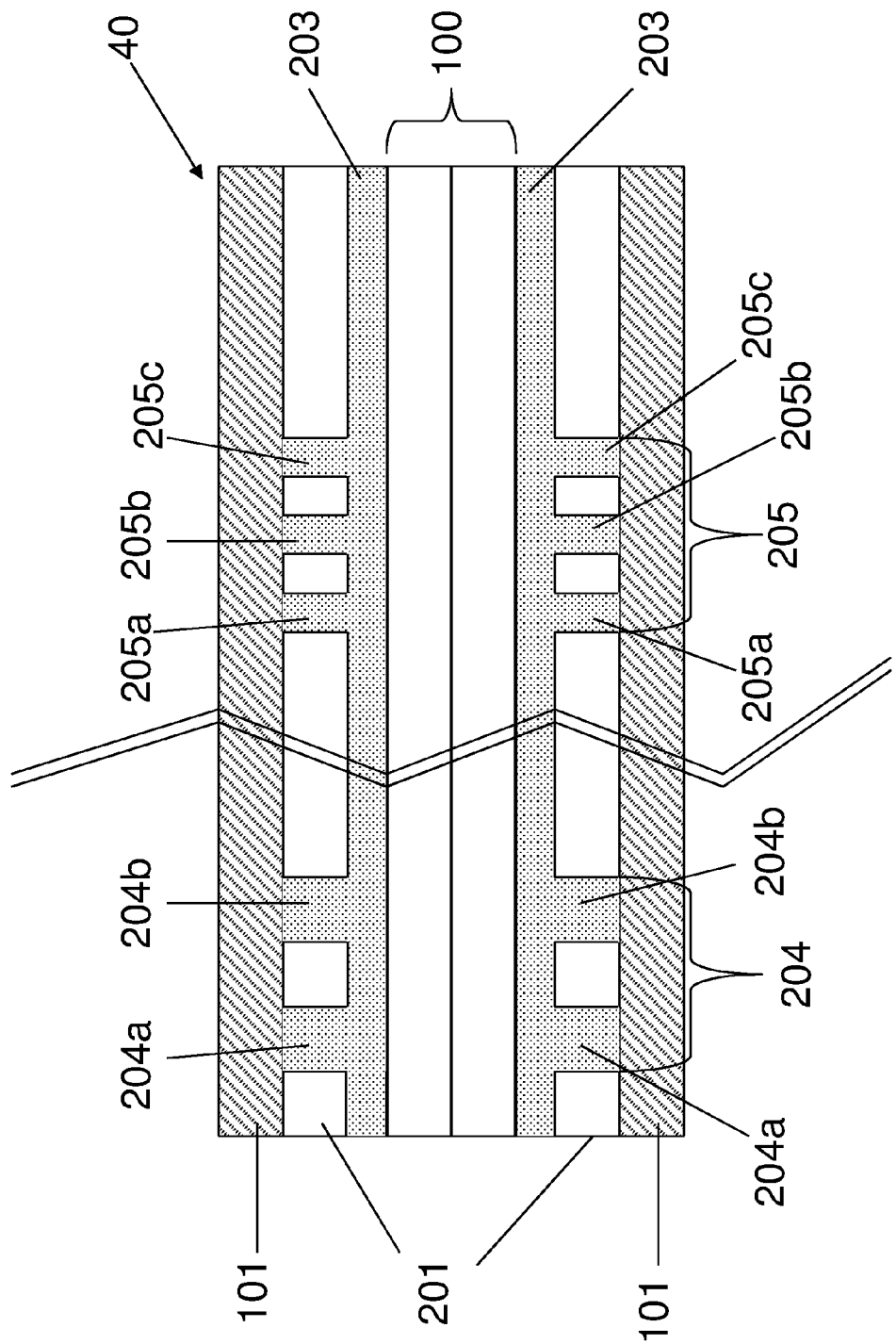
FIG. 6 shows in schematic form a further embodiment of the present invention, wherein a plurality of acoustic sensing points with different periodicities are provided within the same fibre optic cable.

A further embodiment of the present invention is illustrated by FIG. 6, wherein a filler 203 is inserted into a gap 201 between at least one optical fibre arrangement 100 at least one optical fibre arrangement 100 (for example, a FIMT) and an outer layer 101. Similar to that illustrated by FIG. 4, the filler 203 is configured to produce a plurality of built up regions 204, 205 at points interspersed along the fibre optic cable 40 so as to provide discrete coupling points. The built up regions may then be periodically divided into smaller sections, thus producing smaller sensing points within each built up region that are evenly spaced apart. For example, a first built up region 204 and a second built up region 205 both represent discrete coupling points of equal length along the fibre optic cable 40. The first built up region 204 has been equally divided into two smaller coupling points 204a-b, whereas the second built up region 205 has been equally divided into three smaller coupling points 205a-c. Preferably, the built up regions are 10 to 50 cm in length along the fibre optic cable 40, and are periodically divided such that the smaller coupling points are approximately 1 to 5 cm in length along the fibre optic cable 40.

By periodically dividing the discrete coupling regions 204, 205, the resolution at which acoustic energy is sensed is increased since the periodic structure of the discrete coupling regions 204, 205 increases the spatial resolution of the fibre optic cable 40.

Additionally, the periodic structure of the discrete coupling regions 204, 205 can be used to track the eddy flow of a fluid contained within a pipeline or vessel being monitored by the fibre optic cable 40. An eddy is a current of fluid that results when a fluid flows past an object in its path, causing the current of the fluid to change direction with respect to the general motion of the whole fluid. The individual eddies are capable of producing acoustic vibrations, and so by tracking the eddies within the discrete regions of acoustic coupling, 204, 205, an object or defect in the vessel containing the fluid can be detected. To track the eddies, the periodic structure of the discrete coupling regions 204, 205 can be configured such that the spacing between the periodic sending points 204a-b, 205a-c matches the life of the eddies within the monitored pipeline or vessel.

Figure 7:
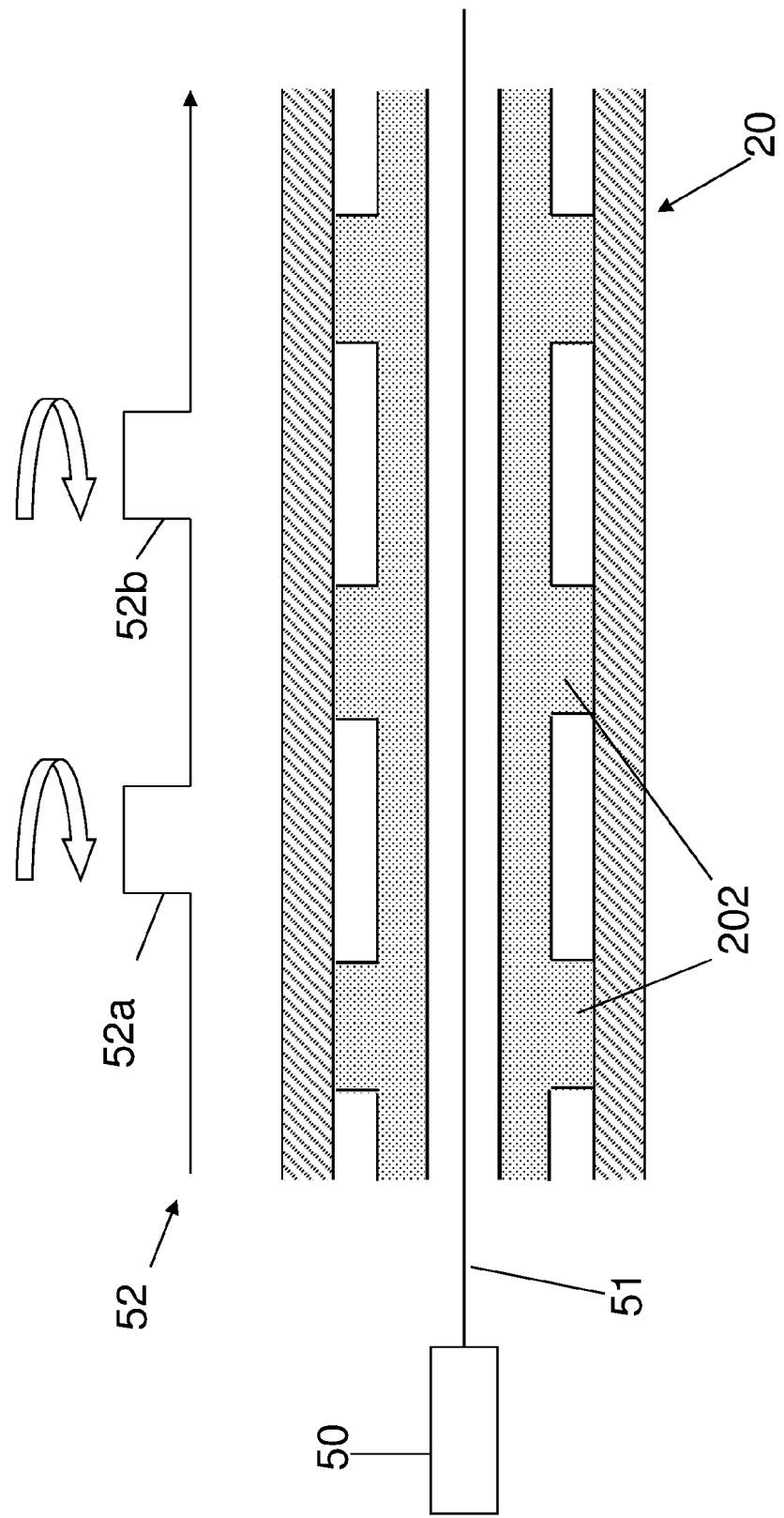
FIG. 7 shows in schematic form the application of a fibre optic cable according to a embodiments of the present invention in systems of distributed acoustic sensing.

Another embodiment of the present invention is illustrated by FIG. 7, wherein a fibre optic cable 20 according to the present invention is used in conjunction with a system 50 for performing distributed acoustic sensing (DAS), for example, the iDAS™, available from Silixa Limited, of Elstree, UK. In FIG. 7, a fibre optic cable 20 as described by FIG. 4 is shown, but it should be appreciated that any fibre optic cable according to the present invention may be used in DAS systems. The DAS system 50 is capable of obtaining a measurement profile along the length of the fibre optic cable 20, digitally recording acoustic fields at intervals along at least one optical fibre 51 contained within the fibre optic cable 20.

A DAS system 50 injects pulsed light into the at least one optical fibre 51 which propagates down the entire length of the at least one optical fibre 51. Light that is then reflected or back scattered by the at least one optical fibre 51 is returned to the DAS system 50, wherein the optical phase data of the returned signal is measured, such that variations in the optical path of the returned signal due to acoustic vibrations are detected. Preferably, the optical phase data measurements are made at discrete sampling points along the length of the at least one optical fibre 51 so that the position of any acoustic vibrations may be determined.

In FIG. 7, the DAS system 50 is controlled such that it is possible to position where the DAS system 50 takes its measurements along the length of the at least one optical fibre 51, by time synchronising the pulsed light with the locations of the discrete coupling regions 202. For example, the DAS system 50 can control its internal processing such that the positions of its effective acoustic measurement points can be controlled with respect to the positions of the discrete coupling regions. In this respect, the DAS system 50 measures the optical phase data of any light reflected or back scattered 52a-b from along the fibre, with changes in the back scatter as a result of incident acoustic vibrations being detected and used to recreate the incident acoustic signal. The processing performed in the DAS can be controlled such that the effective acoustic measurement points along the fibre can be set with respect to the positions of the discrete acoustic coupling regions. For example, as described above in many embodiments it will be beneficial to control the positions of the acoustic measurement points along the fibre so as to coincide with the positions of the discrete acoustic coupling regions. However, in other embodiments there may be modes of operation, such as test modes or calibration modes, or even some operational modes, where it is desirable to synthetically shift (as a result of the signal processing applied in the DAS) the acoustic measurement points with respect to the acoustic coupling regions.

For example, in a test or calibration mode it may be desirable to "move" the acoustic sampling points to be between the acoustic coupling regions, such that acoustic coupling to the sensing points is minimised, so as to reduce background noise for testing or calibration purposes. Additionally or alternatively, in some operational scenarios it may be desirable to synthetically "move" the acoustic sampling points away from the acoustic coupling regions, if for example the acoustic coupling regions are enhancing or highlighting one signal (for example via resonant effects) to the detriment of the detection of others. It will therefore be understood that the DAS can control the relative positions of acoustic sampling points along the fibre with respect to the positions of the acoustic coupling regions, so as to make them coincide, or to be displaced from each other by a varying controllable amount. For example, the acoustic sampling points can be controlled so as to positionally coincide with the acoustic coupling regions (e.g. be in phase with each other), which is the envisaged preferred mode of operation for most applications, or controlled so as to be in any position between the acoustic sampling regions, including, to give a minima signal, positioned substantially halfway between the acoustic coupling regions i.e. such that the acoustic coupling regions and the acoustic sampling points along the fibre are essentially located in anti-phase positions with respect to each other.

In a second aspect of the present invention, a fibre optic cable is provided wherein the acoustic sensitivity of the cable is non isotropic. The fibre optic cable is adapted to provide regions of directional acoustic coupling such that incident acoustic signals are only detected from particular directions. Examples of how this non isotropic sensitivity may be achieved is described below.

Figure 8:
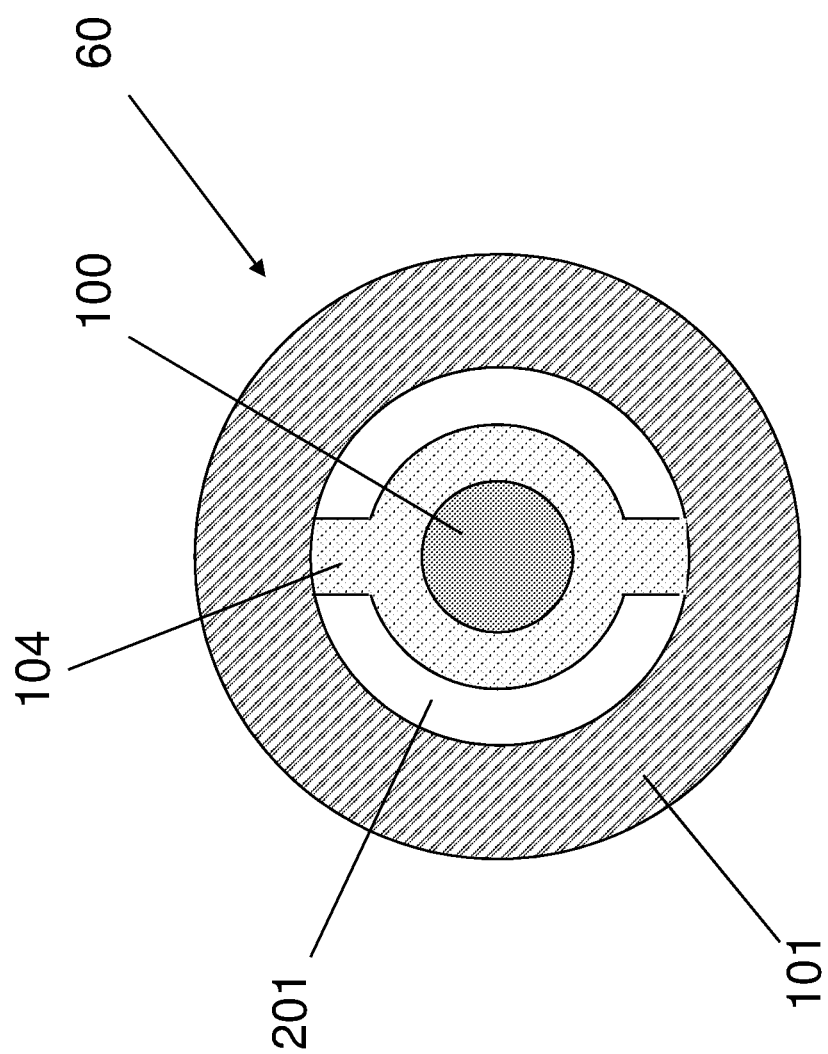
FIG. 8 shows a cross sectional view of another embodiment of the present invention whereby acoustic sensing points are produced so as to be directional in the plane normal to the length of the fibre optic cable.

A further embodiment, with reference to FIG. 8, provides a fibre optic cable 60 comprising a at least one optical fibre arrangement 100 surrounded concentrically by an outer layer 101, such that a gap 200 is provided between the at least one optical fibre arrangement 100 and the outer layer 101. A filler 104 is inserted between the at least one optical fibre arrangement 100 and the outer layer 101, and is configured to provide built up regions which bridge the gap between the outer layer 101 and the at least one optical fibre arrangement 100 in order to facilitate the transfer of acoustic vibrations to the at least one optical fibre arrangement 100. The built up regions are located in at least one direction in the plane normal to the length of the fibre optic cable 60, so as to provide acoustic coupling that is directional in the plane normal to the fibre optic cable 60.

This results in regions of acoustic insulation 201, with low acoustic coupling, in all other directions in the plane normal to the length of the fibre optic cable 60 other than the built up regions. That is to say that incoming acoustic signals will be detected with greater sensitivity in the direction corresponding to the acoustic coupling points produced by the built up regions of filler 104. Additionally, in some embodiments the built up regions may also be interspersed along the length of the fibre optic cable 60, as illustrated by the embodiment shown in FIG. 4, so as to provide discrete coupling points along the length of the fibre optic cable 60 that are also directional in the plane normal to the fibre optic cable 60. In other embodiments, however, the filler regions 104 extend substantially continuously along the length of the fibre optic cable 60.

Figure 9:
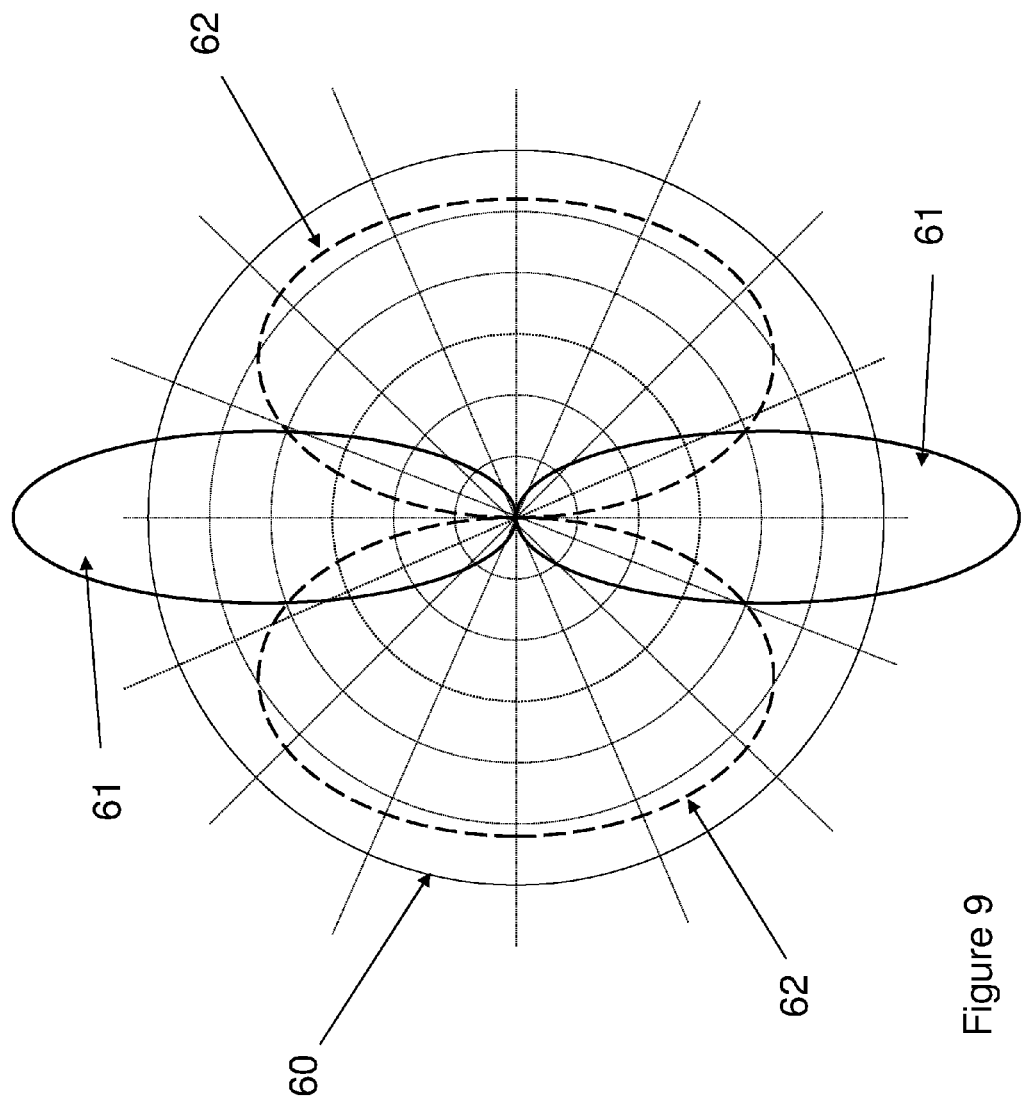
FIG. 9 shows a graphical representation of the non isotropic acoustic sensitivity in relation to the embodiment shown in FIG. 6.

FIG. 9, by way of example, illustrates a possible distribution of acoustic sensitivity 61 and 62 that results from a fibre optic cable 60, as shown in FIG. 8. FIG. 9 shows a response plot relating to the fibre optic cable 60 in the plane normal to its length and the resulting acoustic sensitivity distribution 61 and 62 corresponding to the configuration of fibre optic cable 60 given in FIG. 8. The acoustic sensitivity 61 is focused and enhanced by the regions of acoustic coupling produced by the built up regions of filler 104, since these are the most acoustically reactive regions of the fibre optic cable 60. In comparison, the acoustic sensitivity 62 corresponding to the regions of acoustic insulation 201 is reduced. As a result, an incident acoustic signal is detected by these coupling regions more readily, resulting in an acoustic sensitivity profile 60 and 62, as shown, which is not only directional but also dependent on the size of the regions of acoustic coupling.

Figure 10:
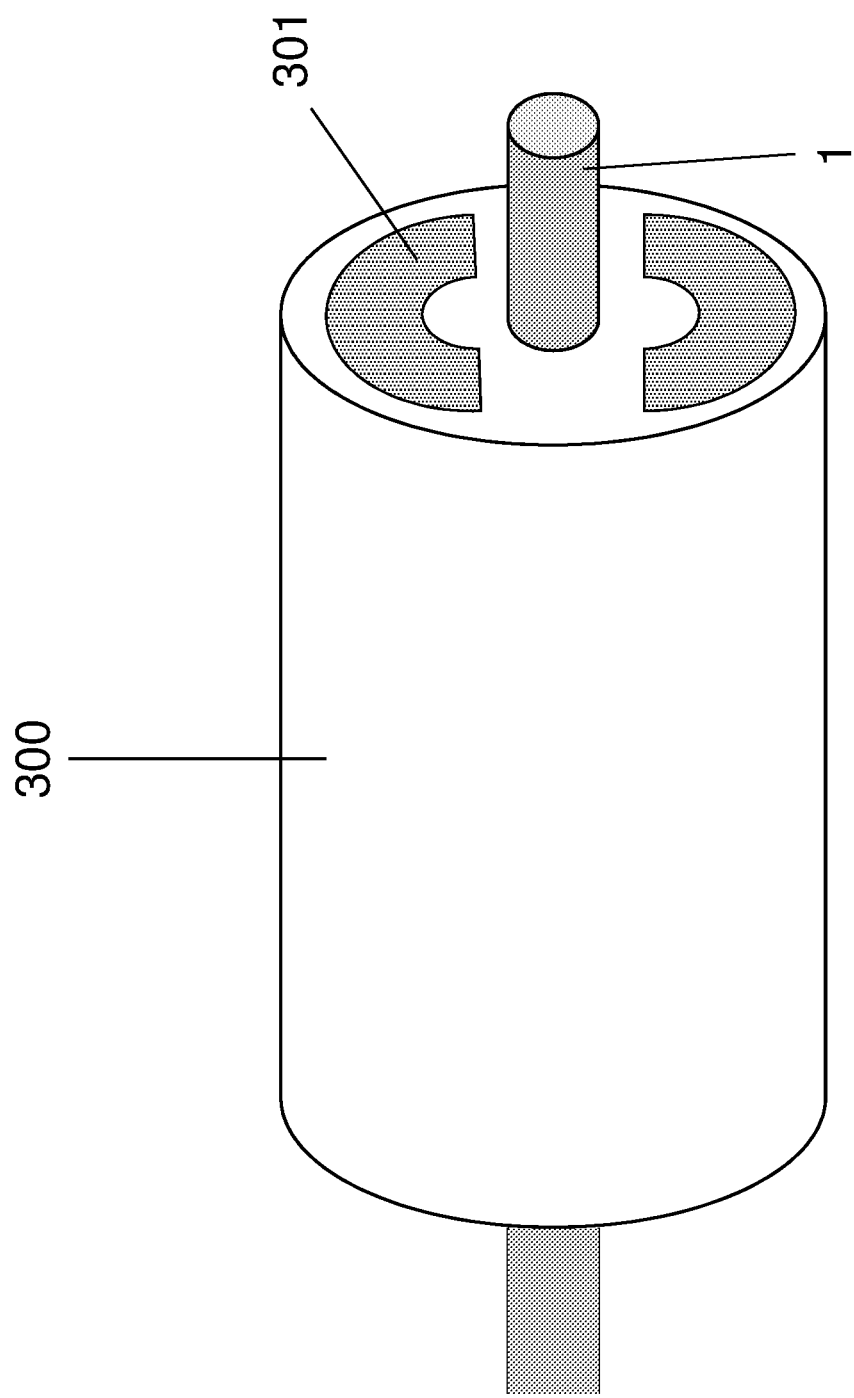
FIG. 10 illustrates a preferred embodiment of the present invention, whereby regions of acoustic insulation are adapted so as to focus acoustic signals directionally in the plane normal to the length of the fibre optic cable.

A further alternative embodiment is shown in FIG. 10, whereby a fibre optic cable 1 is surrounded by an acoustically reactive mass 300. Segments of acoustic insulation 301 are inserted into the mass 300 so as to provide regions of low acoustic coupling in specific directions in the plane normal to the length of the fibre optic cable 1. The insulation results in regions of higher acoustic coupling between the segments of acoustic insulation 301, such that acoustic signals are more readily detected in the directions of the plane normal to the length of the fibre optic cable 1 corresponding to these regions of higher acoustic coupling.

Figure 11:
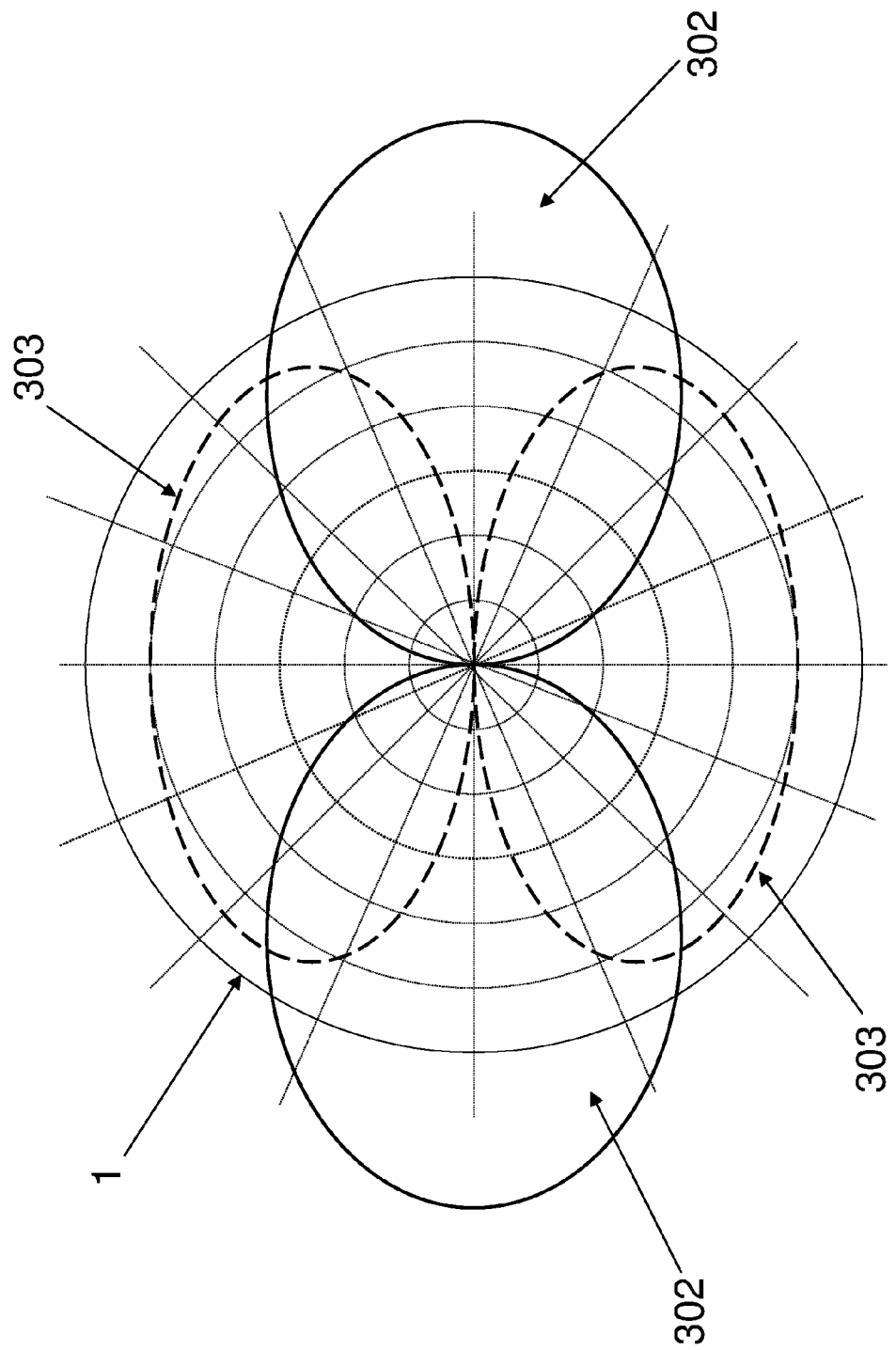
FIG. 11 shows a graphical representation of the non isotropic acoustic sensitivity in relation to the embodiment shown in FIG. 10.

FIG. 11, by way of example, illustrates a possible distribution of acoustic sensitivity 302 and 303 that results from a fibre optic cable 1 surrounded by an acoustically reactive mass 300, such as that shown in FIG. 10. FIG. 11 shows the fibre optic cable 1 in the plane normal to its length and the acoustic sensitivity distribution 302 and 303 corresponding to the configuration provided by the embodiment of FIG. 10. The acoustic sensitivity 302 is focused and enhanced by the regions of higher acoustic coupling that result from the segments of acoustic insulation 301 inserted into the acoustically reactive mass 300 into the nodal regions. The nodal regions of higher acoustic coupling detect incoming acoustic signals more readily, resulting in regions of acoustic sensitivity 302 which correspond to the position and size of the regions of higher acoustic coupling. In comparison, the acoustic sensitivity 303 corresponding to the segments of insulation acoustic 301 is reduced.

Another further embodiment is illustrated in FIG. 12, wherein a fibre optic cable 1 is surrounded by a layer of acoustic insulation material 400, but such that the fibre optic cable 1 is not positioned centrally within the acoustic insulation 400. The acoustic insulation material 400 has low acoustic coupling properties and impedes incoming acoustic signals. The fibre optic cable 1 is located within the acoustic insulation 400 such that the distance from the outer edge of the fibre optic cable 1 to the outer edge of the acoustic insulation 400 varies around the circumference of the fibre optic cable 1. The region where this distance is smallest has higher acoustic sensitivity since incoming acoustic signals are impeded to a lesser degree.

FIG. 13 illustrates a possible resulting acoustic sensitivity profile 401 and 402 for a fibre optic cable 1 surrounded by acoustic insulation material 400, such as that shown in FIG. 12. FIG. 13 shows the fibre optic cable 1 in the plane normal to its length and the distribution of acoustic sensitivity 401 and 402 corresponding to the embodiment of FIG. 12. The acoustic sensitivity 401 is focused and enhanced by the region wherein the distance from the outer edge of the fibre optic cable 1 to the outer edge of the acoustic insulation 400 is smallest since this is the region where incoming acoustic signals are least impeded and more readily detected. In comparison, the acoustic sensitivity 402, corresponding to regions wherein the distance from the outer edge of the fibre optic cable 1 to the outer edge of the acoustic insulation 400 is largest, is reduced.

Figure 14:
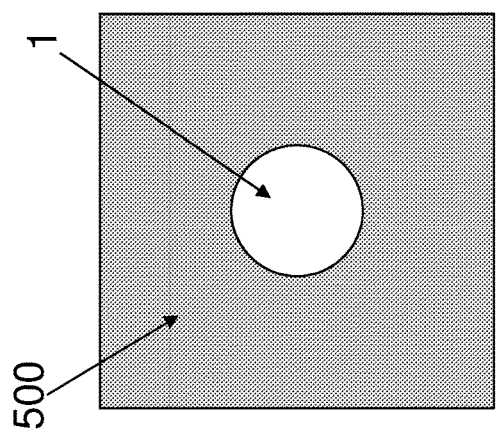
FIG. 14 shows in schematic form another embodiment of the present invention, wherein a fibre optic cable is surrounded by a layer of acoustic insulation material so as to provide non isotropic acoustic sensitivity.

A further embodiment is illustrated by FIG. 14, wherein a fibre optic cable 1 is surrounded by a layer of acoustic insulation material 500, wherein the acoustic insulation 500 is of square configuration. The acoustic insulation material 500 has low acoustic coupling properties and impedes incoming acoustic signals. The fibre optic cable 1 is located centrally within the acoustic insulation 500, but due to the shape of the acoustic insulation 500, the distance from the outer edge of the fibre optic cable 1 to the outer edge of the acoustic insulation 500 varies around the circumference of the fibre optic cable 1. Regions where this distance is smaller have higher acoustic sensitivity since incoming acoustic signals are impeded to a lesser degree.

Figure 15:
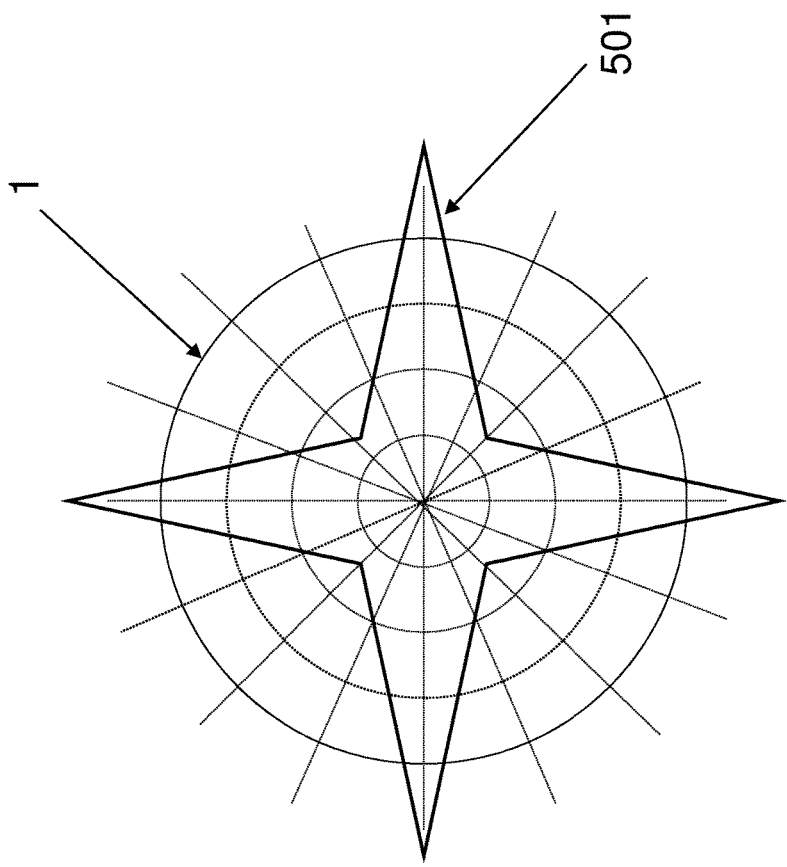
FIG. 15 shows a graphical representation of the non isotropic acoustic sensitivity in relation to the embodiment shown in FIG. 14.

FIG. 15 illustrates a possible resulting acoustic sensitivity profile 501 for a fibre optic cable 1 surrounded by acoustic insulation material 500, such as that shown in FIG. 14. FIG. 15 shows the fibre optic cable 1 in the plane normal to its length and the distribution of acoustic sensitivity 501 corresponding to the embodiment of FIG. 14. The acoustic sensitivity 501 is focused and enhanced by the regions wherein the distance from the outer edge of the fibre optic cable 1 to the outer edge of the acoustic insulation 500 is smaller since these are the regions where incoming acoustic signals are least impeded and more readily detected. In comparison, the acoustic sensitivity 501 corresponding to regions wherein the distance from the outer edge of the fibre optic cable 1 to the outer edge of the acoustic insulation 500 is largest, is reduced.

Figure 16:
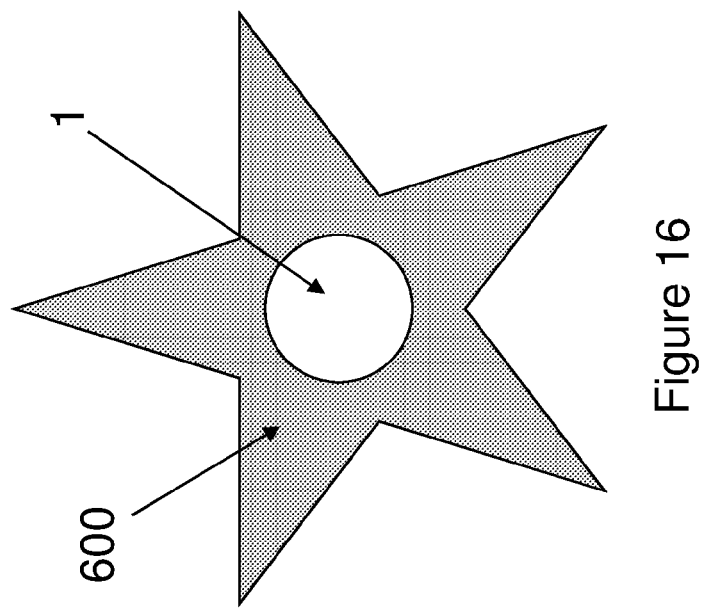
FIG. 16 shows in schematic form another embodiment of the present invention, wherein a fibre optic cable is surrounded by a layer of acoustic insulation material so as to provide non isotropic acoustic sensitivity.

A further embodiment is illustrated by FIG. 16, wherein a fibre optic cable 1 is surrounded by a layer of acoustic insulation material 600, wherein the acoustic insulation 600 is of star configuration. The acoustic insulation material 600 has low acoustic coupling properties and impedes incoming acoustic signals. The fibre optic cable 1 is located centrally within the acoustic insulation 600, but due to the shape of the acoustic insulation 600, the distance from the outer edge of the fibre optic cable 1 to the outer edge of the acoustic insulation 600 varies around the circumference of the fibre optic cable 1. Regions where this distance is smaller have higher acoustic sensitivity since incoming acoustic signals are impeded to a lesser degree.

Figure 17:
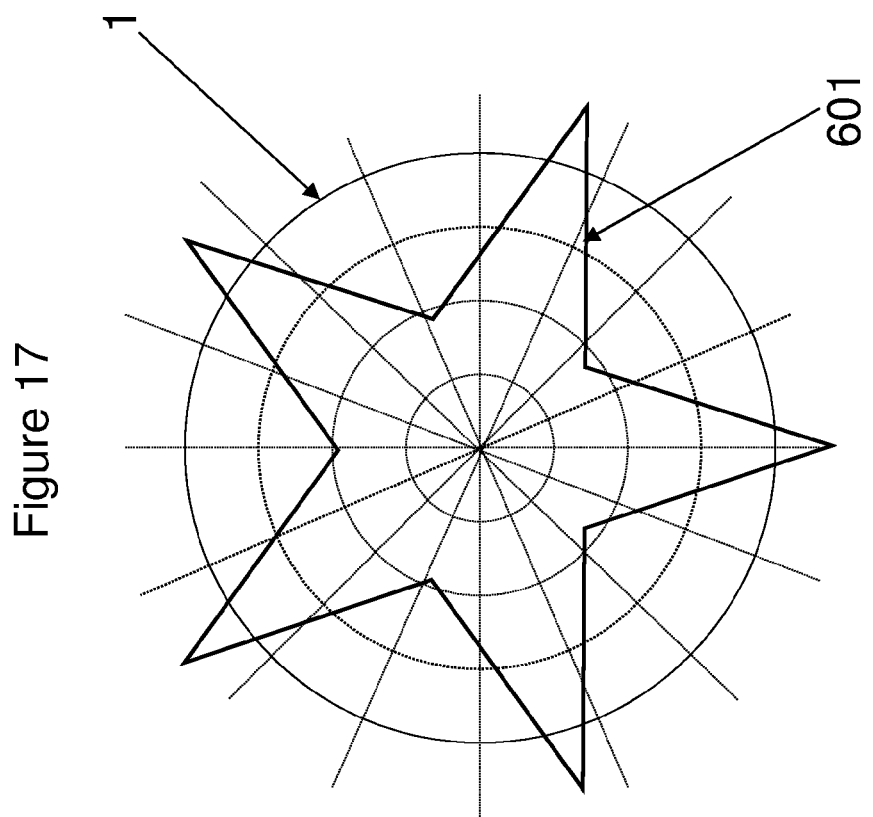
FIG. 17 shows a graphical representation of the non isotropic acoustic sensitivity in relation to the embodiment shown in FIG. 16.

FIG. 17 illustrates a possible resulting acoustic sensitivity profile 601 for a fibre optic cable 1 surrounded by acoustic insulation material 600, such as that shown in FIG. 16. FIG. 17 shows the fibre optic cable 1 in the plane normal to its length and the distribution of acoustic sensitivity 601 corresponding to the embodiment of FIG. 16. The acoustic sensitivity 601 is focused and enhanced by the regions wherein the distance from the outer edge of the fibre optic cable 1 to the outer edge of the acoustic insulation 600 is smaller since these are the regions where incoming acoustic signals are least impeded and more readily detected. In comparison, the acoustic sensitivity 601, corresponding to regions wherein the distance from the outer edge of the fibre optic cable 1 to the outer edge of the acoustic insulation 600 is largest, is reduced.

Figure 18:
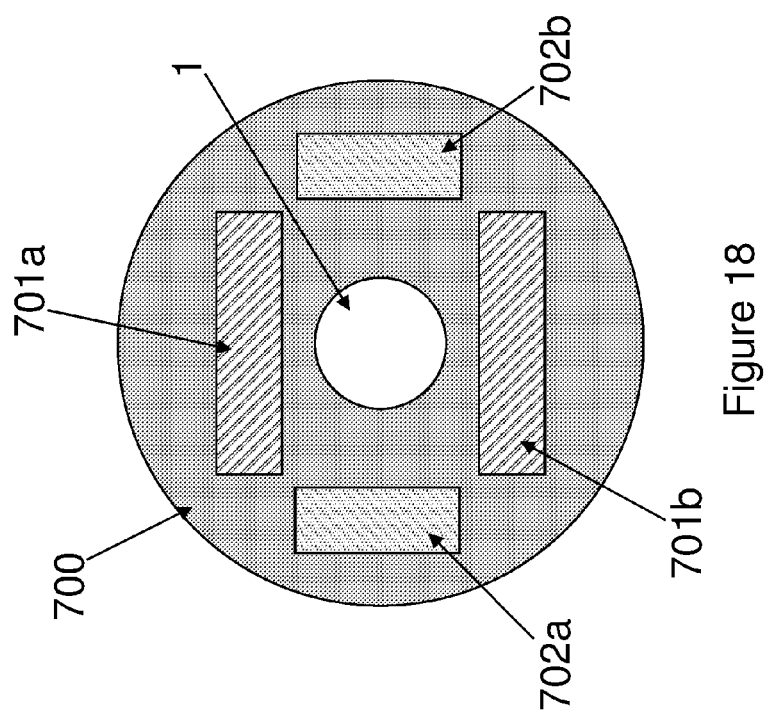
FIG. 18 shows in schematic form another embodiment of the present invention, wherein a fibre optic cable is surrounded by a mass comprising portions of acoustic insulation and portions of material with high acoustic coupling.

Another preferred embodiment is illustrated by FIG. 18, wherein a fibre optic cable 1 is concentrically surrounded by a casing 700 which may be made from an acoustically insulating material that impedes the mechanical vibrations of any acoustic signals which are incident on it. Alternatively, the casing 700 may be made from an acoustically reactive material that easily couples with the mechanical vibrations of any acoustic signals that are incident on it. The casing 700 may comprise a plurality of acoustically reactive segments 701*a-b* made of a material with high acoustic coupling properties so as to directionally enhance the acoustic sensitivity in the plane normal to the length of the fibre optic cable 1. In regions that include acoustically reactive segments 701*a-b*, the fibre optic cable 1 will more easily couple to acoustic vibrations and, therefore, more readily detect incoming acoustic signals. The acoustically reactive segments 701*a-b* may be made of a number of different materials with high acoustic coupling properties, for example, a metal, and may be positioned anywhere within the sleeve 700.

Additionally, the casing 700 may comprise a plurality of segments of acoustic insulation 702*a-b* with low acoustic coupling properties so that incident acoustic signals are impeded in these regions. That is to say, the acoustic sensitivity in directions of the plane normal to the length of the fibre optic cable 1 will be reduced as a result of the segments of acoustic insulation 702*a-b*. The segments of acoustic insulation 702*a-b* may be made of a number of materials with low acoustic coupling properties that act as good acoustic insulators, for example, air, and may be positioned anywhere within the sleeve. In some embodiments, the acoustically reactive segments 701*a-b* may also be interspersed along the length of the fibre optic cable 1, as illustrated by the embodiment shown in FIG. 4, so as to provide discrete acoustic coupling points along the length of the fibre optic cable 1 that are also directional in the plane normal to the fibre optic cable 1. In other embodiments, however, the acoustically reactive segments 701*a-b* extend substantially continuously along the length of the fibre optic cable 1.

Figure 19:
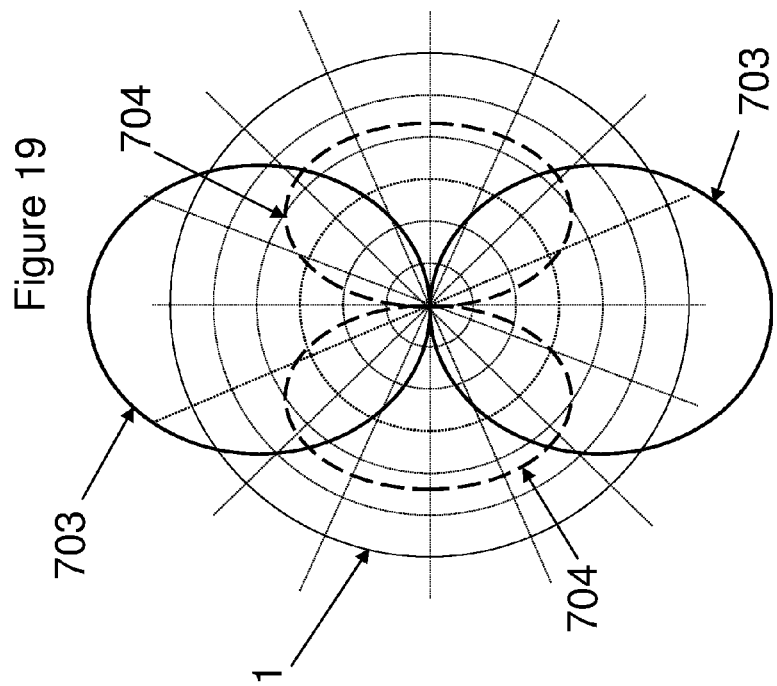
FIG. 19 shows a graphical representation of the non isotropic acoustic sensitivity in relation to the embodiment shown in FIG. 18.

FIG. 19 illustrates a possible resulting acoustic sensitivity profile 703, 704 for a fibre optic cable 1 surrounded by a sleeve 700 that includes acoustically reactive segments 701*a-b* and portions of acoustic insulation 702*a-b*, such as that shown in FIG. 18. FIG. 19 shows a response plot relating to the fibre optic cable 1 in the plane normal to its length, and shows the acoustic sensitivity distribution 703, 704 corresponding to the configuration of the sleeve 700 surrounding the fibre optic cable 1 shown in FIG. 18. The acoustic sensitivity 703 is focused and enhanced by the regions corresponding to the acoustically reactive segments 701*a-b* since these are the most acoustically reactive regions of the arrangement. In comparison, the acoustic sensitivity 704 corresponding to the portions of acoustic insulation 702*a-b* are reduced. Therefore, any incident acoustic signals are more readily detected by the regions of higher acoustic coupling 701*a-b*, resulting in the acoustic sensitivity profile of FIG. 19, which is not only directional but also dependent on the size of the acoustically reactive segments 701*a-b* and the portions of acoustic insulation 702*a-b*.

FIGS. 9, 11, 13, 15, 17 and 19 are to be taken as projected distributions of acoustic sensitivity for the respective fibre optic cable embodiments and are merely indicative for qualitative understanding purposes only. The actual resulting acoustic sensitivities may differ from these embodiments and these profiles are only intended to provide an indication of their appearance.

Figure 1:
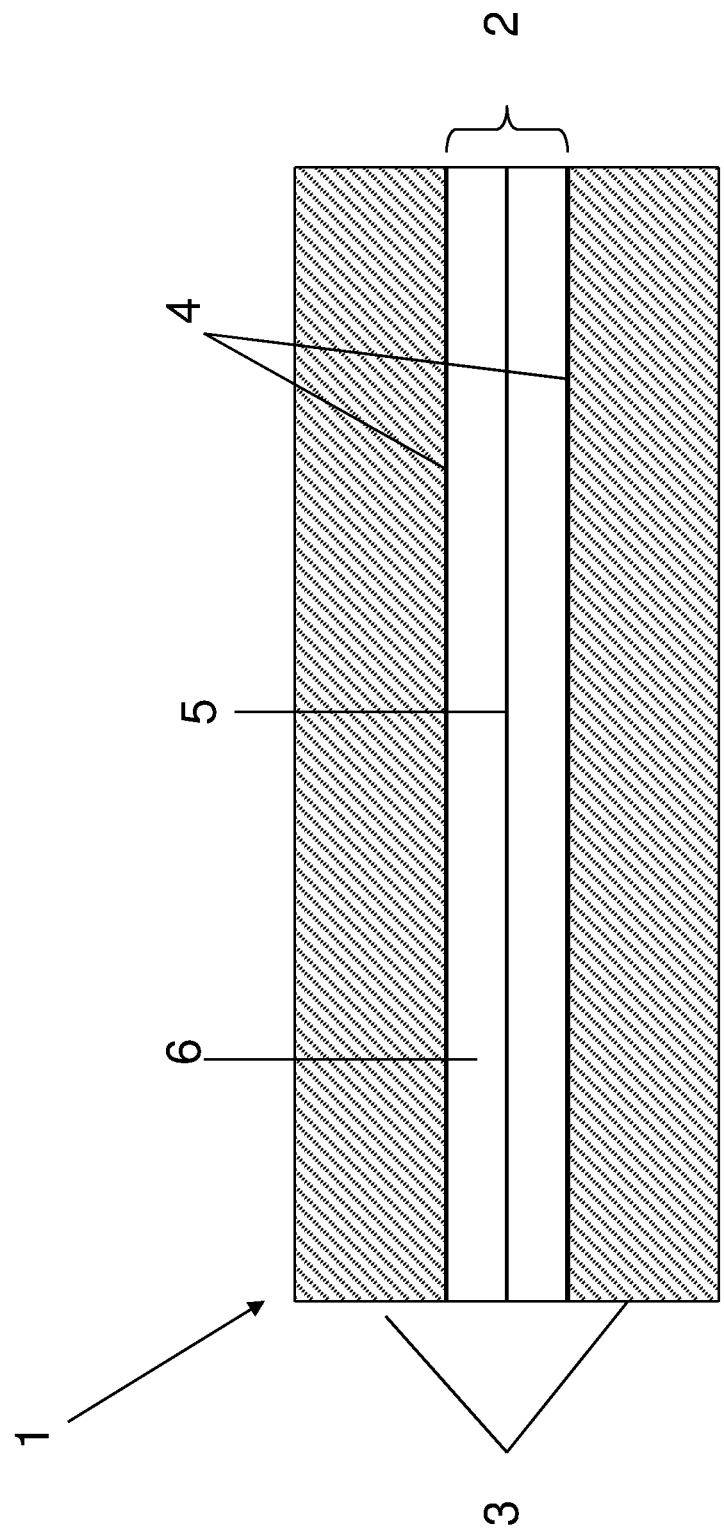
FIG. 1 illustrates an example fibre optic cable of the prior art.

Alternative embodiments may include fibre optic cables 1 with at least one optical fibre arrangement 101 that is not comprised of a FIMT as described by the prior art FIG. 1, but of some other arrangement comprising at least one optical fibre encapsulated in a sealed tube.

Another example of a further embodiment may be a fibre optic cable 1, where the narrowed portions along the fibre optic cable 1 are achieved by some means other than crimping, such as an outer layer which is manufactured so as to include regions which are curved inwards so as to make contact with the at least one optical fibre arrangement 100 at points interspersed along the length of the fibre optic cable 1. These points of contact produce the regions of acoustic coupling.

Another further embodiment is a fibre optic cable 1 that uses an acoustic insulation material other than air, such as an acoustic foam. Additionally, a combination of acoustic insulators may be used in order to provide regions of low acoustic coupling and hence enhance the acoustic coupling between the at least one optical fibre arrangement 100 and outer layer 101. Preferably, the acoustic insulating materials are chosen such that the acoustic coupling of the acoustic insulating region is of an optimum value to prevent the transmission of acoustics energy or at least sufficiently different to that of the discrete coupling regions so as to impede the acoustic signal at a different rate.

Optionally, an acoustically reactive mass 300, as shown in FIG. 10, may be located at points interspersed along the length of the fibre optic cable 1 so as to produced discrete coupling points along the length of the fibre optic cable 1, which are also directional in the plane normal to the length of the fibre optic cable 1.

A further modification may include a fibre optic cable, surrounded by a layer of acoustic insulation wherein the distance from the outer edge of the fibre optic cable to the outer edge of the acoustic insulation is not uniform around the circumference of the fibre optic cable, thus resulting in an acoustic sensitivity profile that varies directionally and is non isotropic.

Various modifications, whether by way of addition, deletion or substitution may be made to the above described embodiments to provide further embodiments, any and all of which are intended to be encompassed by the appended claims.

The invention claimed is:

1. A fibre optic cable, comprising:
   at least one optical fibre arrangement; and
   at least one outer layer;
   the cable further comprising an acoustic insulating layer between the at least one optical fibre arrangement and the outer layer, wherein the acoustic insulating layer further comprises a filler, the filler comprising an inner wall and a plurality of built-up regions protruding radially outwardly from the inner wall and bridging the acoustic insulating layer so as to extend between the at least one optical fibre arrangement and the at least one outer layer, the plurality of built up regions being interspersed along the length of the fibre so as to provide discrete acoustic coupling regions for transmitting acoustic energy from the outer layer to the at least one optical fibre arrangement, wherein the acoustic insulating layer between the plurality of built up regions has relatively lower acoustic coupling than the plurality of built up regions.

2. A fibre optic cable according to claim 1, wherein the at least one optical fibre arrangement comprises a fibre-in-metal-tube (FIMT).

3. A fibre optic cable according to claim 1, wherein the acoustic insulating layer includes a layer of air.

4. A fibre optic cable according to claim 1, wherein the distance between the discrete acoustic coupling regions is at least 1 m; and/or
   the size of the discrete acoustic coupling regions along the length of the fibre optic cable is at most 50 cm; and/or
   the size of the discrete acoustic coupling regions along the length of the fibre optic cable is at least 10 cm.

5. A fibre optic cable according to claim 1, wherein the discrete acoustic coupling regions comprise a periodic structure.

6. A fibre optic cable according to claim 5, wherein the periodic structure is achieved by dividing the discrete acoustic coupling regions into equal portions, wherein the size of the equal portions along the length of the fibre optic cable is at most 5 cm and/or at least 1 cm.

7. A distributed acoustic sensing system, comprising a fibre optic cable of claim 1, wherein the locations of the discrete acoustic coupling regions are known and match the resolution of the distributed acoustic sensing system.

* * * * *